Jan. 22, 1924.  
O. H. THOMAS  
TIRE ALARM  
Filed Oct. 17, 1922

1,481,654

Inventor  
Owen H. Thomas.

Witnesses

Patented Jan. 22, 1924.

1,481,654

UNITED STATES PATENT OFFICE.

OWEN H. THOMAS, OF OSAGE CITY, KANSAS.

TIRE ALARM.

Application filed October 17, 1922. Serial No. 595,123.

*To all whom it may concern:*

Be it known that I, OWEN H. THOMAS, a citizen of the United States, residing at Osage City, in the county of Osage and State of Kansas, have invented certain new and useful Improvements in Tire Alarms, of which the following is a specification.

This invention relates to signaling devices and has special reference to an alarm or indicator for flat, or partially deflated tires such as are used on automobiles and the like.

One important object of the invention is to improve the general construction of devices of this character.

A second important object of the invention is to provide an improved device of this character which may either be used in connection with the ordinary valve stem or which may have a special stem, and be used without connection to such valve stem.

A third important object of the invention is to provide an improved device of this character which is simple of construction and which may be readily manufactured at a low cost.

A fourth important object of the invention is to provide an improved device of this character which, during the running of the automobile, will give a continuous series of signals until the deflated tire is attended to by properly inflating the same.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:—

Figure 1:
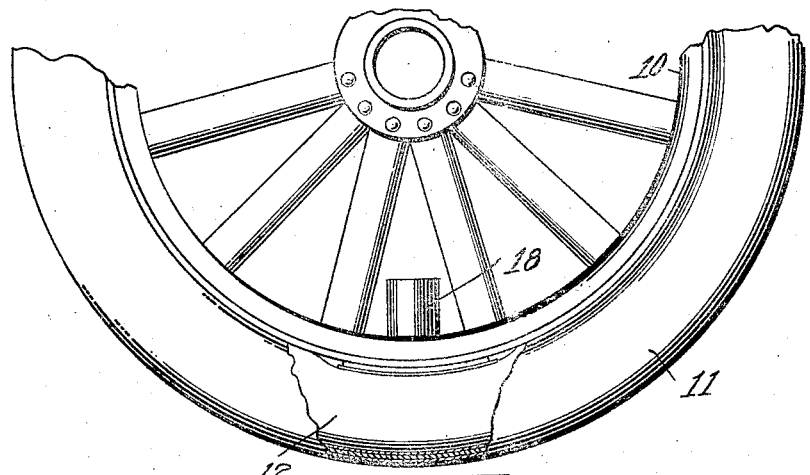
Figure 1 is a side elevation of a portion of an automobile wheel showing the device in position thereon.
Figure 2:
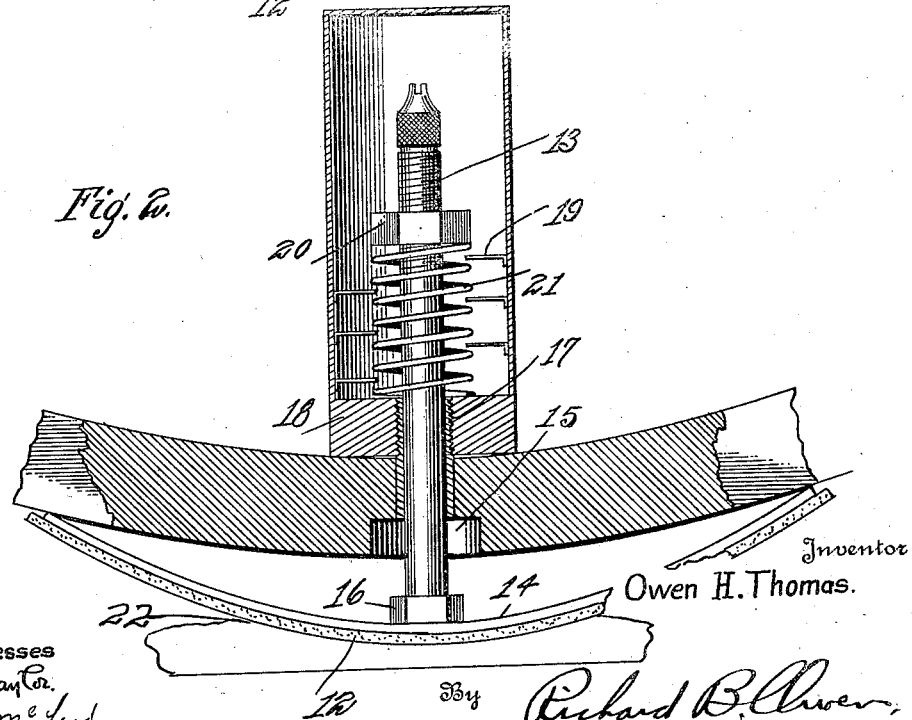
Figure 2 is an enlarged section through such an automobile wheel and showing the device in position.

In the present instance, the device has been shown in connection with an automobile wheel having the usual rim 10, shoe 11 and inner tube 12. At 13 is indicated a stem and this stem may either be a valve stem of the inner tube as ordinarily provided or it may be a special stem passed through a suitable opening in the rim 10. In either case, the outer end of this stem carries a plate 14 which is elongated of spring metal so bowed as to constantly urge the stem outward through the opening 15 of the rim 10. When the stem 13 is the valve stem, the plate 14 may be used to take the place of the ordinary outside plate of the inner tube 12, being held in position on the tube in the usual manner by a nut 16. Fitted in the opening 15 is a guide sleeve 17 through which the stem 13 passes slidably and screwed on the inner end of the sleeve 17 is a cylindrical housing or casing 17 from the sides of which project sounding tongues or reeds 19. On the stem 13 is mounted a nut 20 between which end the outer end of the casing 18 is arranged a light coil spring 21 which is heavy enough to operate the reeds 19 when properly manipulated but which is not heavy enough to materially affect the action of the spring plate 14. In operation, just as long as the inner tube 12 is properly inflated, the spring 14 will lie flat against the rim 10 as shown in Figure 1. Whenever the tire gets soft, or flat, the spring 14 bows outward as shown in Figure 2. When in this position every time the wheel revolves the spring 14 is brought into position beneath the wheel hub and thus will have to support the weight of the vehicle so that the stem 13 is pushed upwards and by this upward movement, the spring 21 engages and snaps, or sounds the tongues 19. Thus, every time a soft wheel makes a revolution the tongues will vibrate and a musical note is produced which immediately attracts the driver's attention to the fact that he has a soft, or flat tire. It will be obvious that the casing, or housing 18 may be made of some suitable metal so that the two will vibrate when the reeds 19 are snapped and thus reinforce the sound given by these reeds.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention what is claimed as new, is:—

1. In a device of the kind described, a housing adapted to be secured to the inner side of a wheel rim, a stem projecting through said rim into said housing and movable longitudinally thereof, spring means urging said stem outward, sounding reeds carried by the interior of the housing and means operable by the movement of the stem to engage and snap said reeds.

2. In a device of the kind described, a housing adapted to be secured to the inner side of a wheel rim, a stem projecting through said rim into said housing and movable longitudinally thereof, spring means urging said stem outward, sounding reeds carried by the interior of the housing, and a nut on said stem within said housing, and a spring between said nut and the bottom of said housing having a diameter greater than the distance between the reeds taken diametrically across the housing whereby said spring may engage and snap the reeds as the stem is moved longitudinally of said housing.

3. The combination with an automobile wheel and its inflatable tire, of a spring plate interposed between the rim of the wheel and said tire, said plate being bowed to press its normal concave side toward the center of the tire, the radius of the bowing being less than the radius of the wheel, a stem extending through the rim of the wheel and carried by the center of said spring, a housing surrounding the inner end of said stem, sounding reeds projecting radially inward from the sides of the housing and a light spring arranged between said nut and the outer end of the housing, said spring having a diameter greater than the distance between the reeds taken diametrically across the housing.

4. The combination with an automobile wheel and its inflatable tire, of a housing adapted to be secured to the inner side of said wheel rim, sounding reeds carried by the interior of said housing, a stem reciprocatably mounted within said housing, and extending through said wheel rim, and a substantial distance within said inflatable tire, of a spring plate carried by the end of said stem and interposed between the rim of the wheel and said tire, said plate being bowed to press its normal concave side toward the center of the tire, and means mounted near the other end of said stem and positioned within said housing, to engage and snap said reeds.

In testimony whereof I affix my signature in presence of two witnesses.

OWEN H. THOMAS.

Witnesses:
C. L. McCaig,
E. C. Allen.